United States Patent [19]

Kukreja et al.

[11] Patent Number: 4,747,004
[45] Date of Patent: May 24, 1988

[54] MAGNETIC HEAD POSITIONING APPARATUS

[75] Inventors: Jagmohan S. Kukreja, Claremont; John C. Van Valkenburgh; Kurt A. Buckland, both of Irvine, all of Calif.

[73] Assignee: Archive Corporation, Costa Mesa, Calif.

[21] Appl. No.: 849,146

[22] Filed: Apr. 7, 1986

[51] Int. Cl.⁴ .............................................. G11B 5/55
[52] U.S. Cl. .................................................... 360/106
[58] Field of Search .................... 360/106; 74/424.8 A

[56] References Cited

U.S. PATENT DOCUMENTS

| | | |
|---|---|---|
| 3,809,827 | 5/1974 | Oyaba . |
| 3,833,922 | 9/1974 | DeBell et al. . |
| 3,858,452 | 1/1975 | Galland ..................... 74/424.8 A X |
| 4,071,866 | 1/1978 | Butsch ................................. 360/106 |
| 4,155,269 | 5/1979 | Lee ................................. 74/424.8 A |
| 4,212,043 | 7/1980 | Baker . |
| 4,313,143 | 1/1982 | Zarr . |
| 4,333,116 | 6/1982 | Schoettle ....................... 360/109 X |
| 4,376,961 | 3/1983 | Torii ..................................... 360/106 |
| 4,514,775 | 4/1985 | Manning et al. . |
| 4,559,571 | 12/1985 | Olmstead et al. . |
| 4,573,091 | 2/1986 | Barton, Jr. et al. . |
| 4,608,615 | 8/1986 | Zeavin . |
| 4,609,958 | 9/1986 | Irvin et al. . |
| 4,609,959 | 9/1986 | Rudi . |
| 4,622,606 | 11/1986 | Rudi . |

OTHER PUBLICATIONS

A photocopy of California Computer Products Head Positioning Mechanism (photograph not included).

*Primary Examiner*—A. J. Heinz
*Attorney, Agent, or Firm*—Knobbe, Martens Olson & Bear

[57] ABSTRACT

A magnetic read/write head is mounted on a carriage having a semi-circular recess therein. A threaded lead screw is partially surrounded by the recess. A partial nut having an arcuate front surface with two male thread segments thereon engages the lead screw. The partial nut is supported on the carriage so that rotation of the screw causes movement of the carriage relative to the screw, in a direction parallel to the longitudinal axis of the screw. The partial nut is biased into engagement with the screw by a coil spring which extends between the partial nut and a cap which is spaced from the rear surface of the partial nut. The spring applies a constant, predetermined force on the partial nut. The direction of the spring force is substantially parallel to the longitudinal axis of the spring. Thus, the head can be precisely positioned by the rotation of the lead screw. Also disclosed is a method of positioning the magnetic head.

7 Claims, 2 Drawing Sheets

MAGNETIC HEAD POSITIONING APPARATUS

BACKGROUND OF THE INVENTION

The present invention relates generally to tape drives, and more particularly to an apparatus which positions a magnetic read/write head relative to a length of magnetic tape. The disclosure of commonly assigned U.S. Patent Application Ser. No. 849,410, filed Apr. 7, 1986 and entitled "Cartridge Loading Apparatus", is hereby incorporated by reference.

Many small business and personal computer systems utilize backup memory devices in the event of a malfunction in the principal memory device of the computer. Previously, floppy disk drive units have been used to store data in such an event. As an alternative to floppy disk drives, streaming tape drives have been developed as a means for storing data on a length of ¼" wide magnetic tape which is wound within a tape cartridge. As a backup memory device, tape drives are preferably to floppy disk drives because tape drives have a much greater storage capacity, and can load data onto a computer much more quickly.

To store as much data as possible on the magnetic tape, the data is recorded on a number of parallel, longitudinally oriented tracks on the tape. In order to read and write the data onto the tape in separate tracks, the magnetic head must be able to move transversely across the tape in increments as small as the width of a track, and be maintained in the proper orientation at each track. Typically, a lead screw driven by a stepper motor is provided for this purpose. The head is mounted on a positioning apparatus which threads onto the lead screw so that for a given amount of rotation of the lead screw, the head is displaced a predetermined distance across the tape.

To increase the data storage capacity of the tape, the tape is divided into more tracks which are smaller in width. As a result, the head must be positioned with even greater precision. Thus, the clearance between the head positioning apparatus and the lead screw must be minimized to prevent motion of the head other than when the lead screw is rotating.

Further, it is desirable for the head positioning apparatus to occupy as little space as possible. This enables the external dimensions of the tape drive to be minimized, so that the tape drive can fit within a standard size enclosure within a computer.

Thus, a need exists for a compact head positioning apparatus which allows precise positioning of a magnetic head so that multiple tracks of data may be recorded on a length of magnetic tape.

SUMMARY OF THE INVENTION

The present invention is an apparatus for mounting a magnetic head on an externally threaded lead screw so that rotation of the lead screw moves the magnetic head relative to a magnetic data storage medium, such as magnetic tape.

In a preferred embodiment, the apparatus comprises a carriage on which the magnetic head is mounted. The carriage includes a recess through which the lead screw is guided so that the carriage is movable relative to the lead screw. The apparatus further comprises a partial nut, the front of which has an arcuate surface that engages the lead screw. A male thread segment protrudes outwardly from the arcuate surface, and mates with the threading on the lead screw. A cap is secured to the carriage and is spaced from the rear of the partial nut. A spring extends between the partial nut and a surface on the cap which is positioned directly behind the partial nut.

A feature of the present invention is that the spring applies a force to the partial nut which remains substantially constant. This force clamps the lead screw between the recess and the partial nut, preventing motion of the carriage relative to the lead screw other than during rotation of the lead screw. As a result, the magnetic head can be precisely positioned by rotation of the lead screw, enabling multiple tracks of data to be stored on the tape. Additionally, the force can be maintained at a level low enough to prevent damage to the partial nut, even if formed from a molded polymer.

The partial nut is attached to the carriage by a securing means which allows the partial nut to move in a direction toward the lead screw. The spring is oriented so that the longitudinal axis of the spring is substantially parallel to the direction of motion of the partial nut. The biasing force is generated by compressing the spring between the cap and the partial nut.

The overall dimensions of the present head positioning apparatus may be relatively small, which advantageously enables the apparatus to be used in smaller tape drives.

The present invention thus provides an improved apparatus and a method for positioning a magnetic head with a cartridge positioning apparatus. The head is positioned by guiding the lead screw relative to the carriage so that the carriage is movable along the lead screw. The lead screw is engaged with the partial nut so that the threading on the lead screw mates with the thread segment on the partial nut. The partial nut is biased into engagement with the lead screw by the spring to prevent motion of the carriage relative to the lead screw other than during rotation of the lead screw. By rotating the lead screw, the carriage is caused to move along the lead screw.

DETAIL DESCRIPTION OF A PREFERRED EMBODIMENT

Figure 1:
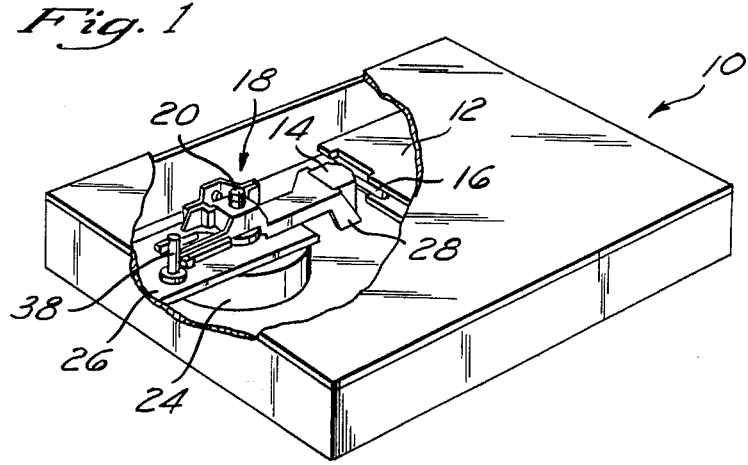
FIG. 1 is a partial cut away perspective view of a tape drive in which a head positioning apparatus according to a preferred embodiment of the present invention is mounted.
Figure 2:
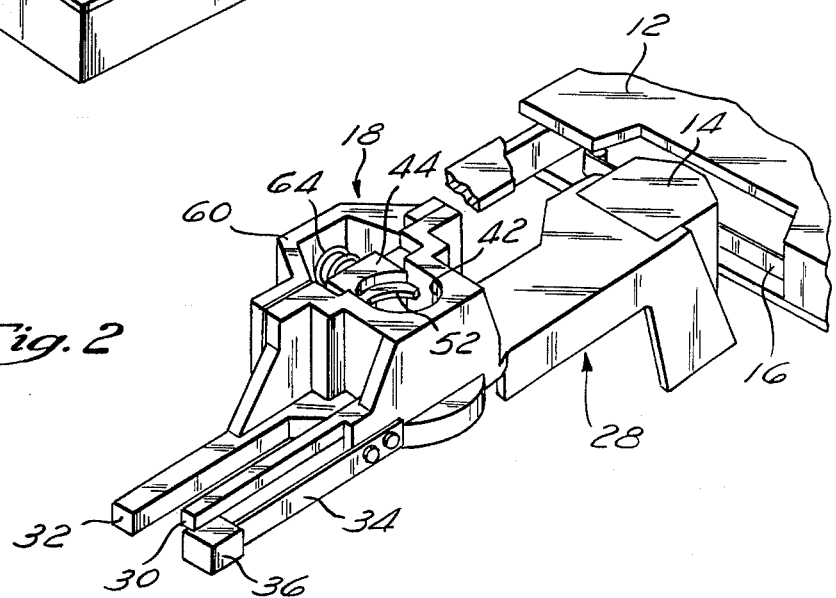
FIG. 2 is a perspective view of the present head positioning apparatus.
Figure 3:
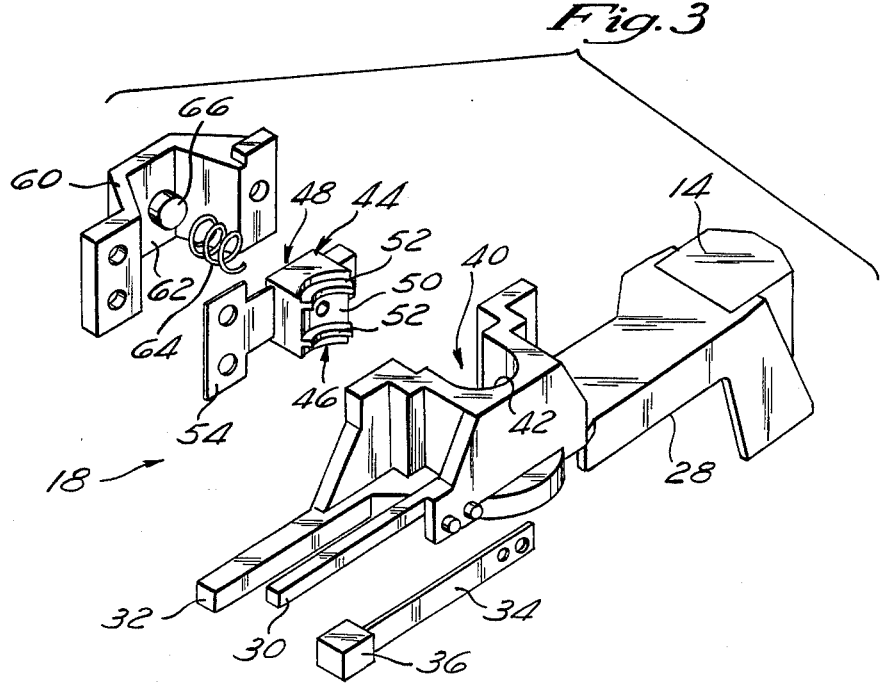
FIG. 3 is an exploded perspective view of the present head positioning apparatus.

FIG. 1 shows a tape drive 10 which is used to store data on a tape cartridge 12. A magnetic head 14 engages a length of magnetic tape 16 wound within the cartridge 12. The head 14 is mounted on a head positioning apparatus 18 which enables the head 14 to move transversely across the tape 16, so that multiple tracks of data may be recorded on the tape 16.

Figure 5:
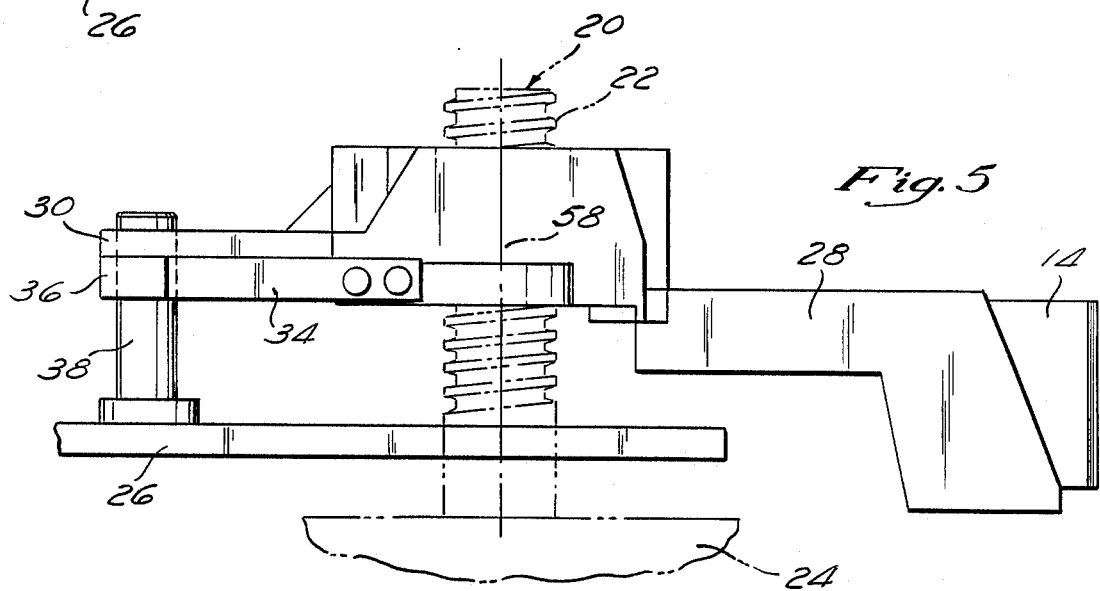
FIG. 5 is a side elevation of the present head positioning apparatus, with a lead screw and stepper motor shown in broken lines.

The head 14 is moved by rotation of a lead screw 20 which has external threading 22, as is best shown in FIG. 5. The lead screw 20 is rotated by a stepper motor 24, which in turn is mounted on the housing 26 of the tape drive 10.

Figure 4:
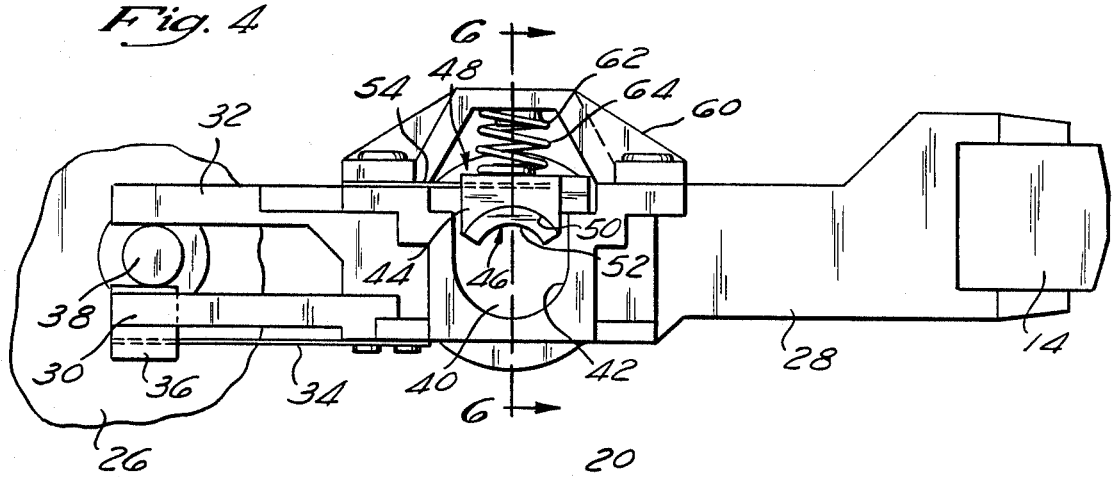
FIG. 4 is a top plan view of the present head positioning apparatus.

The head positioning apparatus 18 is shown in detail in FIGS. 2 through 6. The head 14 is mounted at one end of a carriage 28. The other end of the carriage 28 terminates in a pair of parallel, elongated tines 30, 32. An elongated flexure bar 34 is pinned to the end of the carriage 28 and extends outwardly, parallel to the tines 30, 32. The bar 34 terminates in a hammer 36. As is best shown in FIG. 4, the edge of the hammer 36 is slightly offset toward tine 32 compared to the edge of the tine 30. A stationary, cylindrical post 38 extends upwardly from the tape drive housing 26, and passes between the tines 30, 32. The tine 32 and hammer 36 are spaced a distance approximately equal to the diameter of the post 38 so that the hammer 36 and tine 32 engage the surface of the post 38. The tine 30 prevents the flexure 34 from being overstressed.

A recess 40 is provided at a location proximate the midpoint of the carriage 28. The recess 40 extends from the bottom of the carriage 28 to the top of the carriage 28, and has a smooth, curved surface 42 which preferably semi-circular in shape. The diameter of the semi-circular surface 42 is approximately equal to the outside diameter or major diameter of the threads 22 on the lead screw 20. The lead screw 20 extends through the recess 40 with sufficient clearance to allow the carriage 28 to slide relative to the lead screw 20.

Positioned directly opposite the recess 40 is a partial nut 44. The partial nut 44 has a front 46 and a rear 48, with the front 46 facing towards the recess 40. The front 46 includes an arcuately curved surface 50. Two male thread segments 52 protrude outwardly from the curved surface 50. The thread segments 52 mate with the external threading 22 on the lead screw 20. Alternatively, the number of thread segments 52 may be greater than two, or as few as one.

Figure 6:
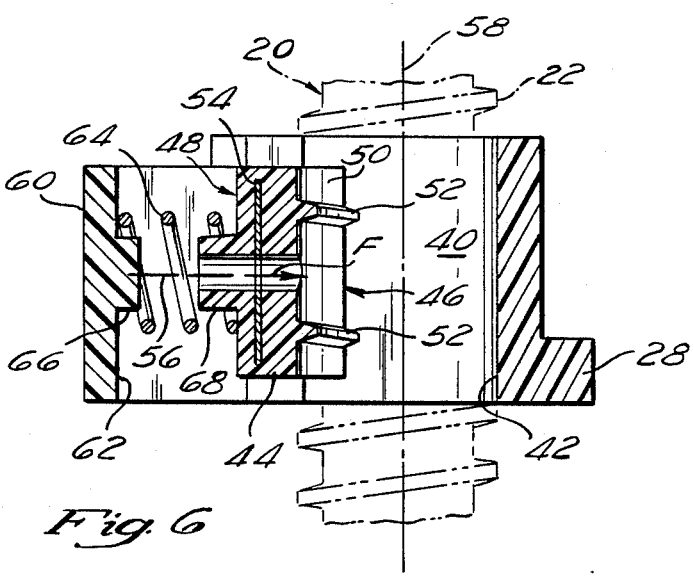
FIG. 6 is a cross sectional view taken along line 6—6 in FIG. 4, with a lead screw shown in broken lines.

The partial nut 44 is secured to the carriage 28 by means of a support member 54. The support member 54 is attached to the partial nut at a location behind the arcuate surface 50, and is also attached to the carriage 28. The support member 54 is a thin, flexible, substantially planar metal plate. Referring to FIG. 6, flexing the support member 54 allows the partial nut 44 to move in either direction along an axis 56, which is substantially normal to a longitudinal axis 58 of the lead screw 20.

As shown in FIG. 4, the width of the partial nut 44 is slightly less than the width of the recess 40, so that the partial nut 44 can advance forwardly into the recess 40.

A cap 60 is attached to the carriage 28 opposite the recess 40. The cap 60 includes a surface 62 which is spaced directly behind the rear 48 of the partial nut 44. A coil spring 64 extends between the surface 62 on the cap 60 and the rear 48 of the partial nut 44. The spring 64 is oriented so that a longitudinal axis 56 of the spring 64 is coincident with the axis 56 along which the partial nut 44 is movable. The longitudinal axis 56 of the spring 64 is substantially normal to the surface 62 of the cap 60 and substantially normal to the longitudinal axis 58 of the lead screw 20. The spring 64 is held in position by a pin 66 which extends from the cap surface 62 and a pin 68 which extends from the rear 48 of the partial nut 44. The ends of the spring 64 surround the pins 66, 68.

Preferably, the cap 60, carriage 28, and partial nut 44 are all fabricated from a molded polymer.

In operation, the recess 40 guides the lead screw 20 relative to the carriage 28 so that the carriage 28 is movable in a direction which is substantially parallel to the longitudinal axis 58 of the lead screw 20. The spring 64 is compressed between the cap 60 and partial nut 44, so that a biasing force F is applied to the partial nut 44, forcing the partial nut 44 into engagement with the lead screw 20. The front 46 of the partial nut 44 engages the lead screw 20 so that the threading 22 on the lead screw 20 mates with the thread segments 52 on the partial nut 44. Motion of the partial nut 44 along the axis 56 in a direction toward the lead screw 20 is permitted by the flexibility of the support member 54. The support member 54 is designed so that any biasing force due to elastic deformation of the support member 54 upon flexing will be insignificant relative to the spring force F. The direction of the force F and the direction of motion of the partial nut 44 are both substantially parallel to the longitudinal axis 56 of the coil spring 64.

The head 14 is moved to a desired position relative to the tape 16, by rotating stepping motor 24 a predetermined amount. The carriage 28 is prevented from rotating along with the lead screw 20 by the post 38, causing the thread segments 52 to advance along the lead screw threads 22. Thus, the carriage 28 slides along the lead screw 20 in a direction which is substantially parallel to the longitudinal axis 58 of the lead screw 20. As the lead screw 20 initially rotates, the tine 30 prevents excessive displacement of the hammer 36. Meanwhile, the flexure bar 34 causes the hammer 36 to provide a constant force against the post 38.

Any nominal clearance between the lead screw threading 22 and the thread segments 52 which may allow undesired motion of the carriage 28 is compensated for by applying a sufficient biasing force F to clamp the lead screw 20 between the recess 40 and the partial nut 44. Despite this force F, the smooth surface 42 of the recess 40 allows the carriage 28 to slide relative to the lead screw 20. This arrangement enables a substantially more precise fit between the lead screw 20 and the carriage 28 than say, a full, annular nut (not shown) which must have a significant clearance with the lead screw 20 to prevent binding.

It is critical that a consistent, predetermined force F is applied by the spring 64. If the force F is too low, too much clearance will be allowed between the lead screw 20 and the partial nut 44, resulting in an undesired change in orientation of the carriage 28 and the head 14. If the force F is too high, damage will occur to the thread segments 52, particularly if the partial nut 44 is formed from a molded polymer. In a preferred embodiment, the spring force F is approximately one pound or less.

An important feature of the present invention is the substantially constant force F applied to the partial nut 44. In the preferred embodiment of the invention disclosed herein, the spring 64 applies a consistent force F on the partial nut 44 in part due to the orientation of the spring 64, which causes the force F to be directed substantially parallel to the longitudinal axis 56 of the spring 64. The longitudinal axis 64 of the spring 56 is also parallel to the direction of motion of the partial nut 44. Additionally, the axis 56 passes through the cap surface 62, which is positioned directly behind the partial nut 44. As a result, the spring force F arises solely from compression of the spring 64, and thus is more predictable than if a torque or bending moment were applied to the spring 64.

The precision capable with present head positioning apparatus 18 is evidenced by the fact that the apparatus 18 has been used successfully to record up to as many as 24 tracks of data on ¼" wide tape 16. Further, since the space between the cap 60 and the partial nut 44 is relatively small, the head positioning apparatus 18 is compact, and can be less than 3 inches long by 1 inch wide. As will be apparent to those skilled in the art, the head positioning apparatus 18 may also be used in combination with other magnetic storage media, such as floppy disks (not shown).

We claim:

1. In a tape drive having a magnetic read/write head and a motor which rotationally drives an externally threaded lead screw, an apparatus for mounting the magnetic head on the lead screw so that rotation of the lead screw causes movement of the head relative to a length of magnetic tape within the tape drive, said apparatus comprising:

a carriage on which the magnetic head is mounted, said carriage including a recess which substantially surrounds and conforms to the lead screw so that said carriage slides relative to the lead screw in a direction substantially parallel to the longitudinal axis of the lead screw;

a partial nut having a front and a rear, said front positioned opposite said recess and having an arcuate surface having at least one thread segment mating with the threading on the lead screw;

means for securing said partial nut to said carriage so as to permit motion of said partial nut relative to said carriage only in a direction toward said lead screw;

a cap secured to said carriage, said cap located opposite said recess and spaced directly behind the rear of said partial nut; and a spring for biasing said partial nut so that said thread segment engages the lead screw, said spring extending between said cap and the rear of said partial nut and oriented so that the longitudinal axis of said spring is substantially parallel the direction of movement of said partial nut, said spring applying a consistent, predetermined force on said partial nut, so that said head does not move appreciably relative to the lead screw unless the lead screw is rotated, thus allowing the head to be precisely positioned by rotation of the lead screw, enabling the recording of multiple tracks on said magnetic tape.

2. The apparatus of claim 1, wherein said cap has a surface thereon which is substantially normal to the longitudinal axis of said spring, said spring being compressed between said cap and said partial nut.

3. The apparatus of claim 1, wherein said spring is a coil spring.

4. The apparatus of claim 1, wherein said recess has a smooth, semi-circular surface.

5. The apparatus of claim 1, wherein said partial nut is formed from a molded polymer.

6. The apparatus of claim 5, wherein the force applied by said spring to said partial nut is approximately one pound or less.

7. The apparatus of claim 1, wherein said securing means comprises a plate secured to said carriage and to said partial nut, said plate being flexible to permit movement of said partial nut only in a direction which is substantially normal to the longitudinal axis of the lead screw.

* * * * *